United States Patent
Liou et al.

(10) Patent No.: US 7,561,415 B2
(45) Date of Patent: Jul. 14, 2009

(54) LCD DISPLAY WITH ADJUSTABLE VIEW-ANGLE STRUCTURE

(75) Inventors: Guan-De Liou, Taipei (TW); Chia-Pine Huang, Keelung (TW); Li-Li Lai, Taipei (TW); Stephen Tsai, Sijhih (TW)

(73) Assignee: Hannspree, Inc. (TW)

( * ) Notice: Subject to any disclaimer, the term of this patent is extended or adjusted under 35 U.S.C. 154(b) by 114 days.

(21) Appl. No.: 11/987,042

(22) Filed: Nov. 27, 2007

(65) Prior Publication Data

US 2009/0073337 A1 Mar. 19, 2009

(30) Foreign Application Priority Data

Sep. 10, 2007 (TW) .............................. 96133668 A (51) Int. Cl.
*G06F 1/16* (2006.01)
(52) U.S. Cl. ..................................... 361/679.26; 349/58
(58) Field of Classification Search . 361/679.26–679.3; 349/58
See application file for complete search history.

(56) References Cited

U.S. PATENT DOCUMENTS

| | | | | | |
|---|---|---|---|---|---|
| 4,259,568 | A | * | 3/1981 | Dynesen | 235/1 D |
| 5,128,829 | A | * | 7/1992 | Loew | 361/679.3 |
| 5,555,157 | A | * | 9/1996 | Moller et al. | 361/679.3 |
| 5,607,054 | A | * | 3/1997 | Hollingsworth | 206/320 |
| 5,644,516 | A | * | 7/1997 | Podwalny et al. | 361/679.26 |
| 5,682,182 | A | * | 10/1997 | Tsubosaka | 361/679.27 |
| 5,737,183 | A | * | 4/1998 | Kobayashi et al. | 361/679.58 |
| 5,887,723 | A | * | 3/1999 | Myles et al. | 206/760 |
| 6,034,866 | A | * | 3/2000 | Nobuchi et al. | 361/679.26 |
| 6,094,341 | A | * | 7/2000 | Lin | 361/679.04 |
| 6,301,098 | B1 | * | 10/2001 | Kim | 361/679.55 |
| 6,411,288 | B1 | * | 6/2002 | Min | 361/679.21 |
| 6,697,045 | B2 | * | 2/2004 | Min | 345/156 |
| D489,067 | S | * | 4/2004 | Olson et al. | D14/375 |
| D496,662 | S | * | 9/2004 | Borsboom | D14/371 |
| 6,903,927 | B2 | * | 6/2005 | Anlauff | 361/679.28 |
| 7,054,441 | B2 | * | 5/2006 | Pletikosa | 379/433.12 |
| D525,951 | S | * | 8/2006 | Gibby et al. | D14/126 |
| D526,974 | S | * | 8/2006 | Reza et al. | D14/126 |
| 7,148,874 | B2 | * | 12/2006 | Anzai et al. | 361/679.27 |
| 2003/0002248 | A1 | * | 1/2003 | Nakaya et al. | 361/683 |
| 2004/0160735 | A1 | * | 8/2004 | Ghosh et al. | 361/683 |
| 2005/0105264 | A1 | * | 5/2005 | Chen | 362/683 |

* cited by examiner

*Primary Examiner*—Lisa Lea-Edmonds
(74) *Attorney, Agent, or Firm*—Bacon & Thomas, PLLC (57) ABSTRACT

An LCD display with adjustable view-angle structure includes an LCD body, a cover, and a positioning means. The cover includes a first segment, a second segment, and a third segment, wherein the second segment is connected with a first foldable portion and a second foldable portion which are connected with the first segment and the third segment, respectively. The second segment is attached to the casing of the LCD body. The positioning means is provided at least at a front end of the first segment and on a surface of the third segment. The first segment and the third segment of the cover can wrap around the screen of the LCD body; or alternatively, the front end of the first segment can be retained on the surface of the third segment, whereby, the LCD body can be protected and the view angle of the display can be adjusted.

10 Claims, 7 Drawing Sheets

LCD DISPLAY WITH ADJUSTABLE VIEW-ANGLE STRUCTURE

BACKGROUND OF THE INVENTION

1. Field of the Invention

The present invention relates to an LCD display with adjustable view-angle structure and more particularly, to an LCD display in use of a cover enclosing the LCD body such that when the cover is unfolded, the LCD display can be sustained at an adjusted view angle use of the cover.

2. Description of Related Art

Conventional CRT displays (CRT: Cathode Ray Tube) are bulky, and moreover, are detrimental to human health because of radiation. Such setbacks have been seriously criticized. Gradually, CRT displays have been diminished yearly from the market and replaced by liquid crystal displays (LCDs). In fact, nowadays LCD flat panel displays have been quite popular, and have become the mainstream in the display market.

Currently, LCD displays mostly adopt hinges, which have a characteristic of resilience and tightness, for controlling tilt angle of the displays. This, however, increases cost on additional parts such as supports, frames, hinges, and so forth. In addition, cost on assembly thereof also increases because more manpower and time consumption are required.

Nowadays, most LCD displays focused on appearance and thus having an appealing visual effect, lack a functionality of view-angle adjustment, making inconvenience to viewers. Accordingly, in spite of the fact that the cost on supports, frames, and hinges can be saved, and that lesser manpower and time consumption for assembly are required, it is still undesirable and inconvenience in use because of lacking the functionality of view-angle adjustment.

Given the above, to solve the problem and provide an LCD display with an adjustable view-angle structure so as to bring benefits to the consumers becomes an urge.

SUMMARY OF THE INVENTION

The present invention is to provide an LCD display with adjustable view-angle structure comprising an LCD body, a cover, and a positioning means. The LCD body includes a screen and a casing. The cover includes a first segment, a second segment, and a third segment, wherein the second segment is formed, at both ends, with a first foldable portion and a second foldable portion, respectively, and wherein the first foldable portion is connected with the first segment and the second foldable portion with the third segment, allowing the cover in a folding or unfolding state. The second segment can be attached to the casing of the display. The positioning means can be provided at a front end of the first segment, or on a surface of the third segment. With the help of the first foldable portion and the second foldable portion, the first segment and the third segment of the cover can wrap around the screen; or alternatively, with the help of the positioning means, the front end of the first segment can be retained on the surface of the third segment and thus support the LCD display in a standing position.

According to the present invention, the cover for covering the LCD body can use its first segment and third segment to be folded against each other and thus can be sustained in certain positions, making the view-angle of the LCD display adjustable. Such a structure owns merits not only protecting the display, but also adjusting the view-angle thereof, not to mention the fact that hinges are unnecessary and easy to be carried. With this simple structure, it can save manufacturing cost, manpower and time consuming in assembly.

According to the present invention, the positioning means can be plural slots, ribs, or any equivalents, which are spaced from one another on the third segment so as to be engaged with the front end of the first segment. Through adjustment to the position that the front end of the first segment is selectively engaged with the slots, the LCD display can be adjusted to a desirable view angle.

Further, for the cover, an anchoring plate or a frame may be secured at the front end of the first segment so as to be engaged with one of the plural slots provided on the third segment, thereby enhancing stability of engagement between the first segment and the third segment.

Still further, the positioning means, according to the present invention, may be a rough surface, a Velcro, or other equivalents, provided on the third segment so as to be engaged with the front end of the first segment. In addition, another Velcro may be provided at the front end of the first segment so as to enhance stability of engagement between the first segment and the third segment. The structure in using of the rough surface or the Velcro as the positioning means can facilitate adjusting the view angle of the display in a very small scale.

In the present invention, a handle may be provided at the first foldable portion of the second segment, so that when the first segment and the third segment are folded and wrapped around the LCD body, the LCD display appears in a portable state, making the display carried conveniently.

Further, the first segment of the cover is provided, at one side, with a fastener; whereas the third segment of the cover is provided, at one side corresponding to the fastener, with a fastening hole. Therefore, when the cover is folded and the first segment and the third segment are enclosing the screen, the fastener can be engaged with the fastening hole so as to assure that the first segment and the third segment will not be separated from each other.

The cover, according to the present invention, may be made of hard materials, such as plastic or metal sheets, which are pivotally connected with each other; or soft materials, such as leather, with a hardboard, plastic board or any equivalent materials inside, so that the first segment, the second segment or the third segment cannot be bent or twisted.

Further, the first foldable portion and the second foldable portion of the second segment may be made of flexible materials, so that the cover can be folded or unfolded conveniently, and that the view angle of the LCD display can be adjusted according.

Other objectives, advantages, and novel features of the present invention will become more apparent from the following detailed descriptions when taken in conjunction with the accompanying drawings.

DETAILED DESCRIPTION OF THE PREFERRED EMBODIMENTS

Figure 1:
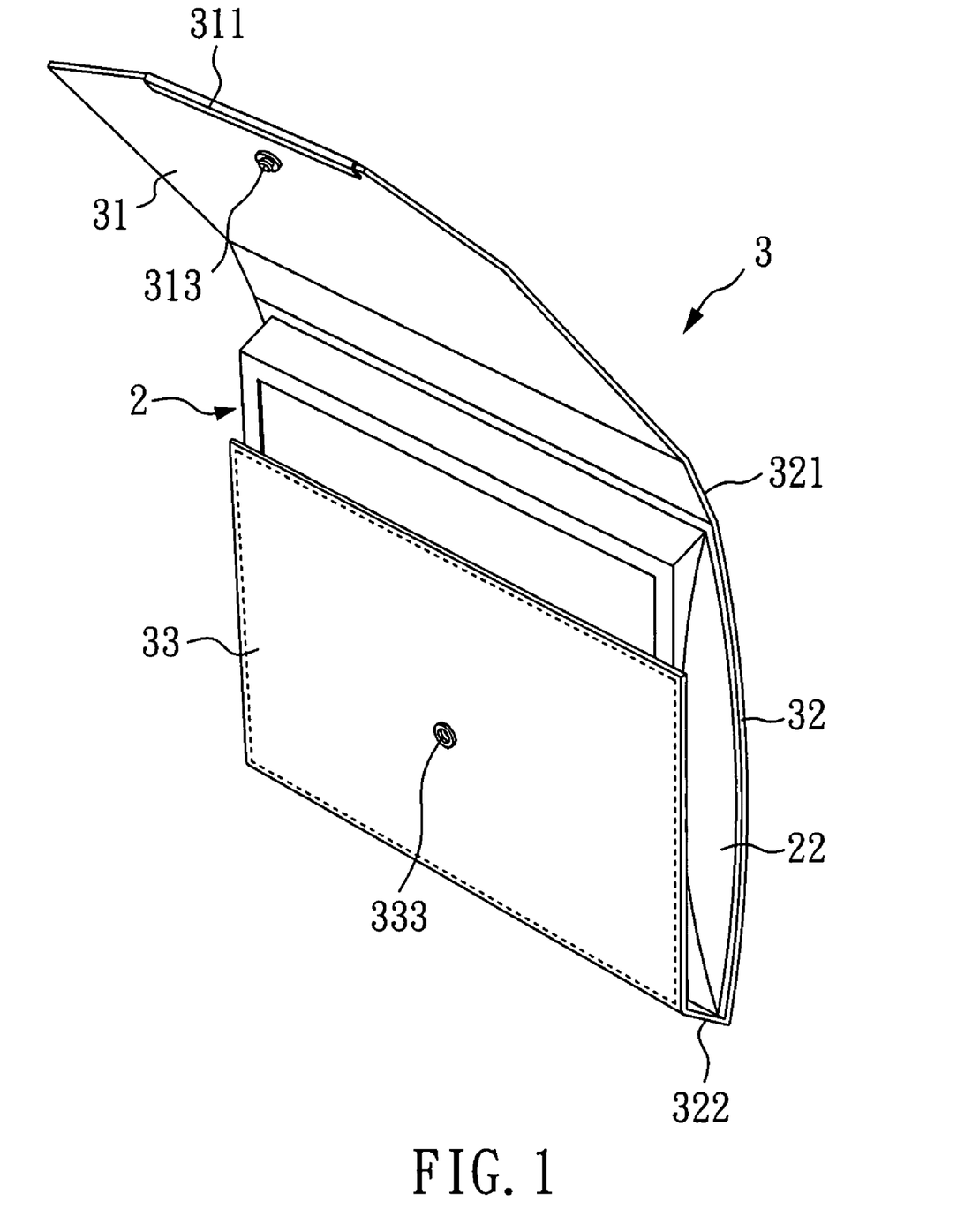
FIG. 1 is a perspective view illustrating an LCD display with adjustable view-angle structure according to a first embodiment of the present invention, wherein the LCD display is half enclosed in a cover.
Figure 2:
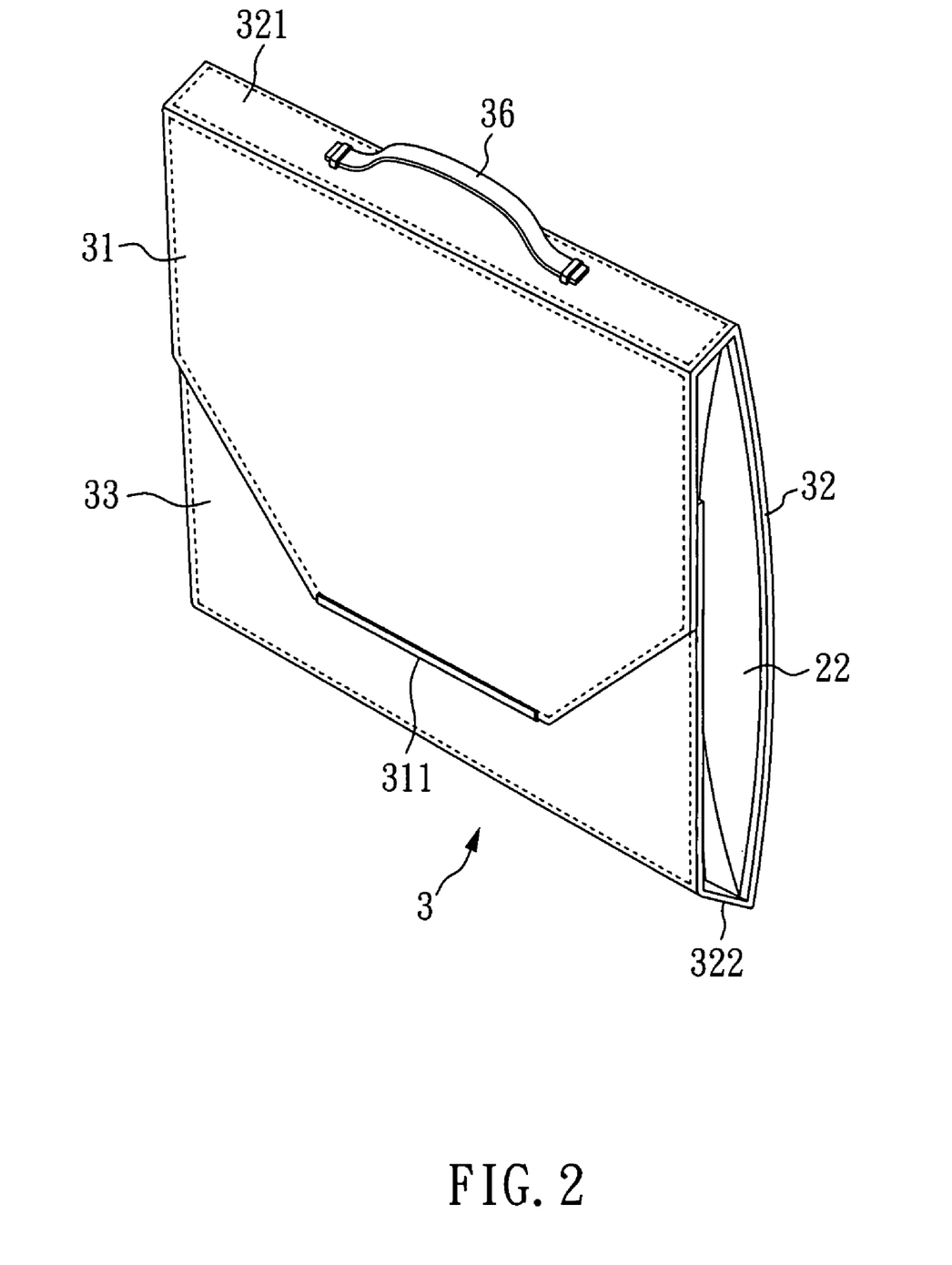
FIG. 2 is a perspective view illustrating the LCD display with adjustable view-angle structure according to the first embodiment of the present invention, wherein the LCD display is fully enclosed in the cover.
Figure 3:
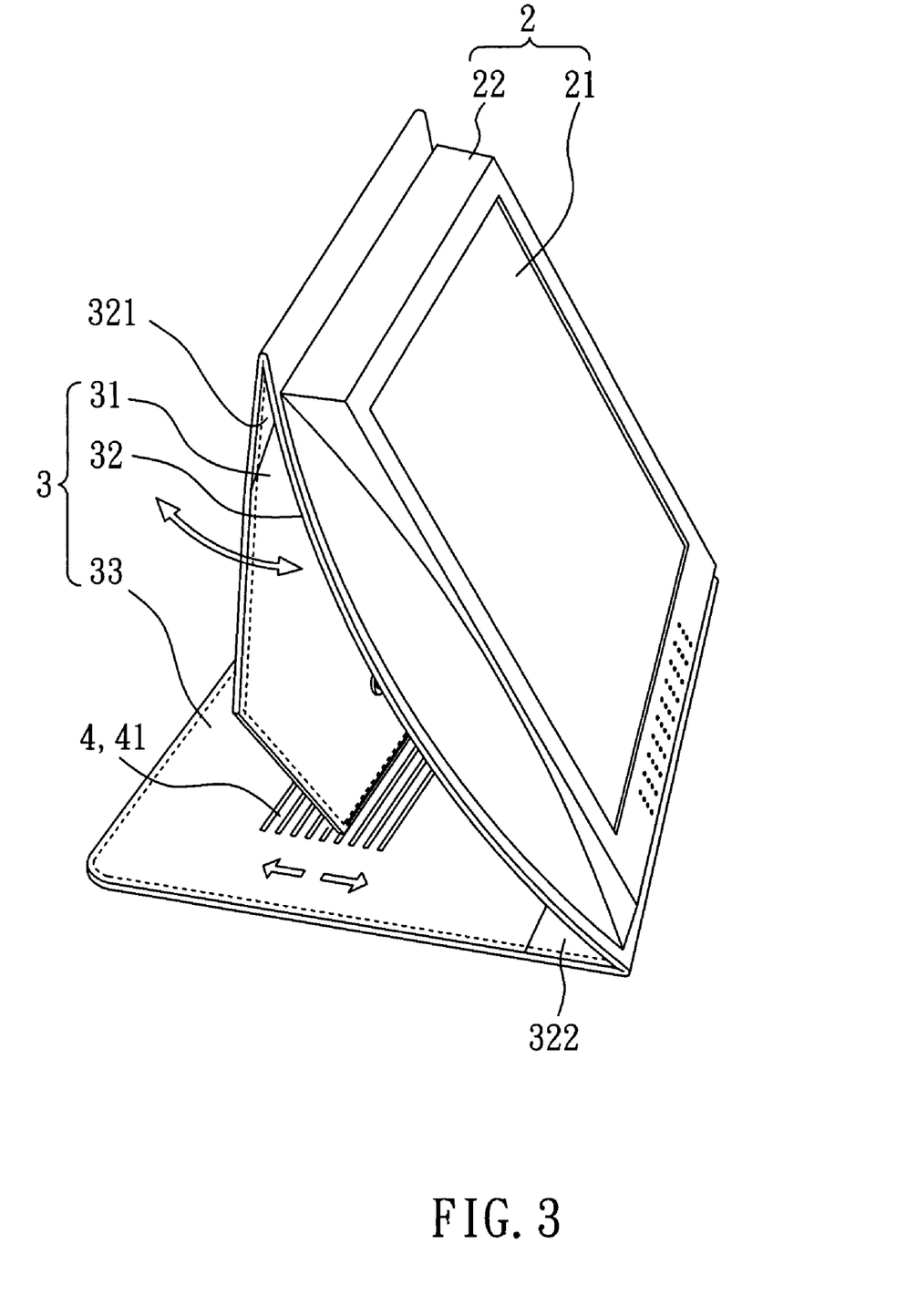
FIG. 3 is a perspective view illustrating the LCD display with adjustable view-angle structure according to the first embodiment of the present invention, wherein the LCD display is sustained in an adjusted angular position.

Referring to FIGS. 1, 2 and 3, an LCD display with adjustable view-angle structure comprises an LCD body 2, a cover 3, and a positioning means 4.

The LCD body 2 includes a screen 21 and a casing 22. The cover 3 includes a first segment 31, a second segment 32, and a third segment 33, wherein the second segment 32 is connected with a first foldable portion 321 and a second foldable portion 322, respectively, and wherein the first foldable portion 321 is connected with the first segment 31 and the second foldable portion 322 is connected with the third segment 33. In the present embodiment, the cover 3 is made of leather, and both the first foldable portion 321 and the second foldable 322 are flexible.

As shown in FIGS. 1 and 2, the second segment 32 of the cover 3 is attached to the casing 22 of the LCD body 2. As a result, for the cover 3, the first segment 31 and the third segment 33 can be folded or unfolded against the second segment 32.

Further, the first segment 31 of the cover 3 is provided, on the inner side, with a fastener 313, whereas the third segment 33 of the cover 3 is provided, correspondingly to the fastener 313, with a fastening hole 333. Therefore, when the cover 3 is folded and the first segment 31 and the third segment 33 are covering the LCD body 2, the fastener 313 can be engaged with the fastening hole 333 to assure that the first segment 31 and the third segment 33 will not easily be separated from each other, so that the LCD body 2 can be wrapped inside the cover 3 (as shown in FIG. 2).

A handle 36 is provided at the first foldable portion 321 of the second segment 32, so that when the first segment 31 and the third segment 33 are folded and wrapped around the LCD body 2. The LCD body 2 appears in a portable state, and that the LCD display can be carried conveniently (as shown in FIG. 2).

Referring to FIG. 3, the positioning means 4 is provided on the surface of the third segment 33, so that when the first segment 31 and the third segment 33 are unfolded, the positioning means 4 can make the front end of the first segment 31 retained on the surface of the third segment 33 and thus support the LCD body 2 in a standing position. In the present embodiment, the positioning means 4 includes a plurality of slots 41 arrayed and spaced from one another, where the slots 41 can be spaced apart equidistantly or non-equidistantly as required, and where one of the slots 41 is selected for adjusting the LCD body 2 at a desirable view angle. In addition, as shown in FIG. 2, at front end of the first segment 31 is secured with a frame 311 so as to enhance stability of engagement between the first segment 31 and the third segment 33.

It is understood that according to the present embodiment, the cover 3 for covers the portable LCD body 2 by the first segment 31 and the third segment 33 which are folded against each other and thus sustained in certain positions. This structure makes the view angle of the LCD body 2 adjustable. Such a structure owns merits not only protecting the LCD body 2, but also adjusting the view angle thereof, not to mention the fact that hinges are unnecessary and with this structure it can save manufacturing cost, manpower and time consumption in assembly.

Figure 4:
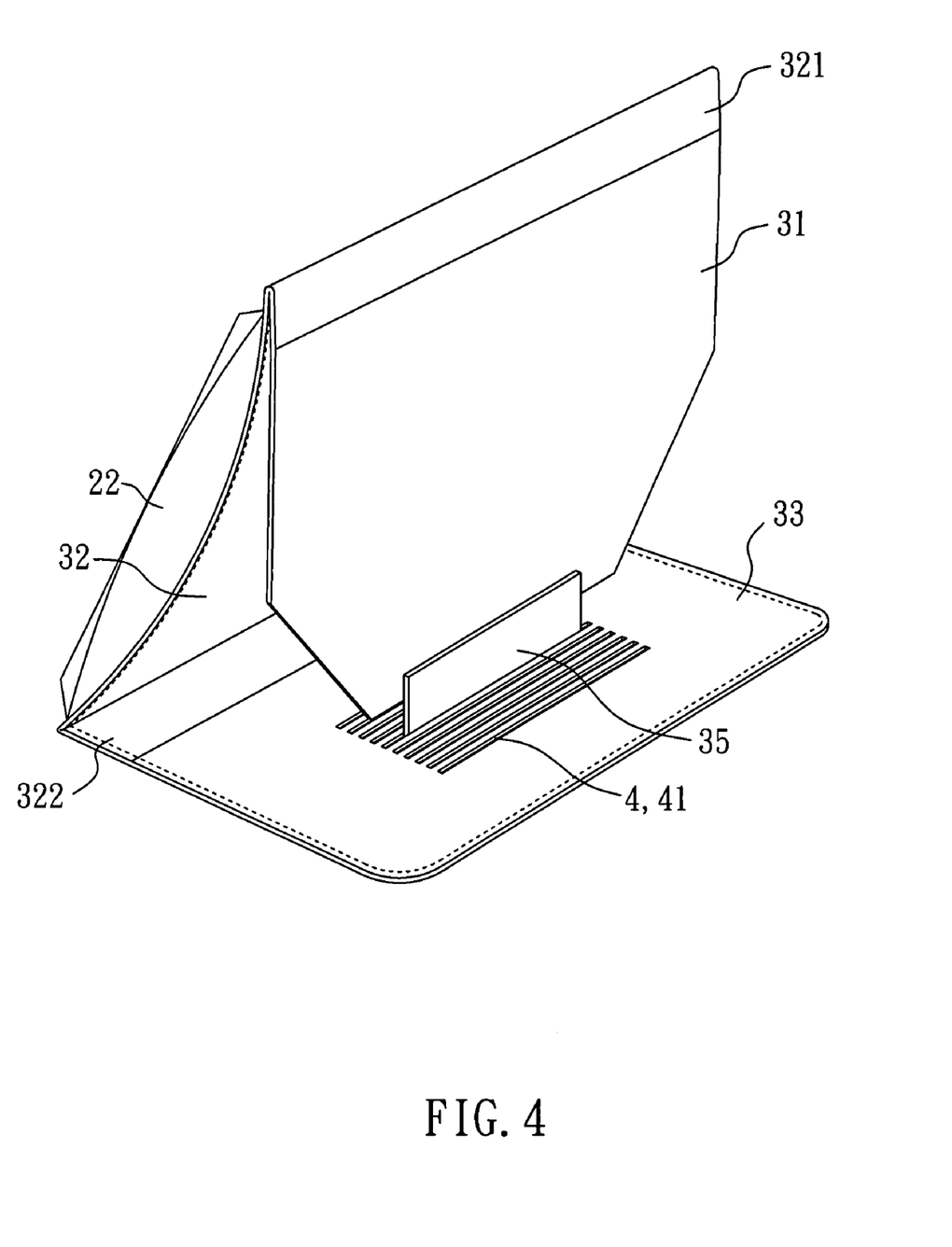
FIG. 4 is a perspective view illustrating an LCD display with adjustable view-angle structure according to a second embodiment of the present invention, wherein the LCD display is sustained in an adjusted angular position.

Referring to FIG. 4, a perspective view illustrating a LCD display with adjustable view-angle structure according to a second embodiment of the present invention. The second embodiment has a structure similar to that of the first embodiment, except that an anchoring plate 35 is secured to the front end of the first segment 31 so as to replace the frame 311. To the effect, by engaging the anchoring plate 35 of the first segment 31 with plural slots 41 of the third segment 33, the second embodiment can also achieve the purposes of protecting the display and adjusting the view angle thereof, and since hinges are unnecessary, manufacturing cost, manpower and time consumption in assembly can be saved.

Figure 5:
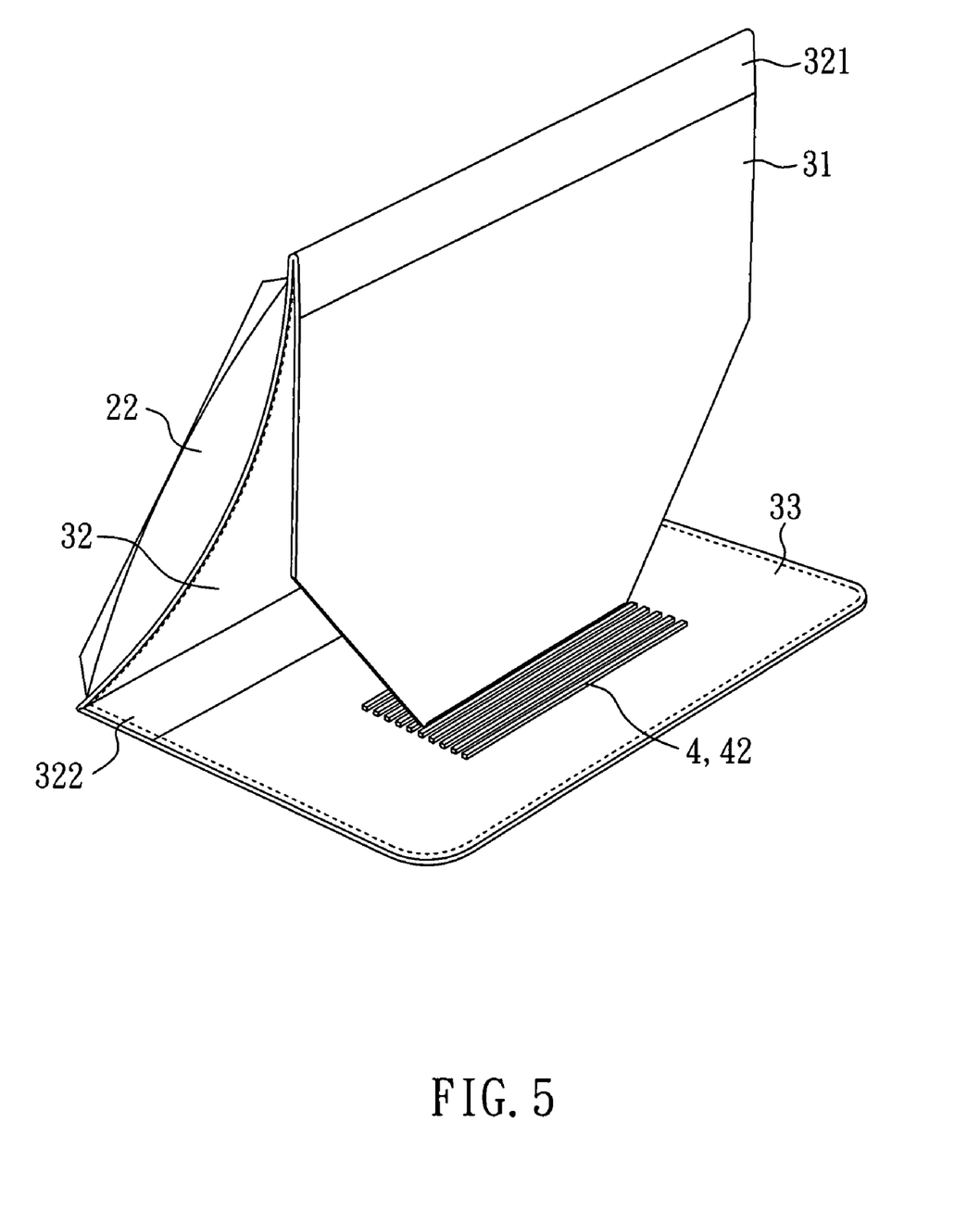
FIG. 5 is a perspective view illustrating an LCD display with adjustable view-angle structure according to a third embodiment of the present invention, wherein the LCD display is sustained in an adjusted angular position.

Further, referring to FIG. 5, a perspective view illustrating a LCD display with adjustable view-angle structure according to a third embodiment of the present invention. The third embodiment has a structure similar to that of the first embodiment except that the positioning means 4 has to a plurality of ribs 42. Namely, the slots 41 arrayed and spaced from one another on the surface of the third segment 33 are replaced with the ribs 42. As such, the purposes of protecting the display, adjusting the view angle thereof, and cost saving can be achieved as well.

Figure 6:
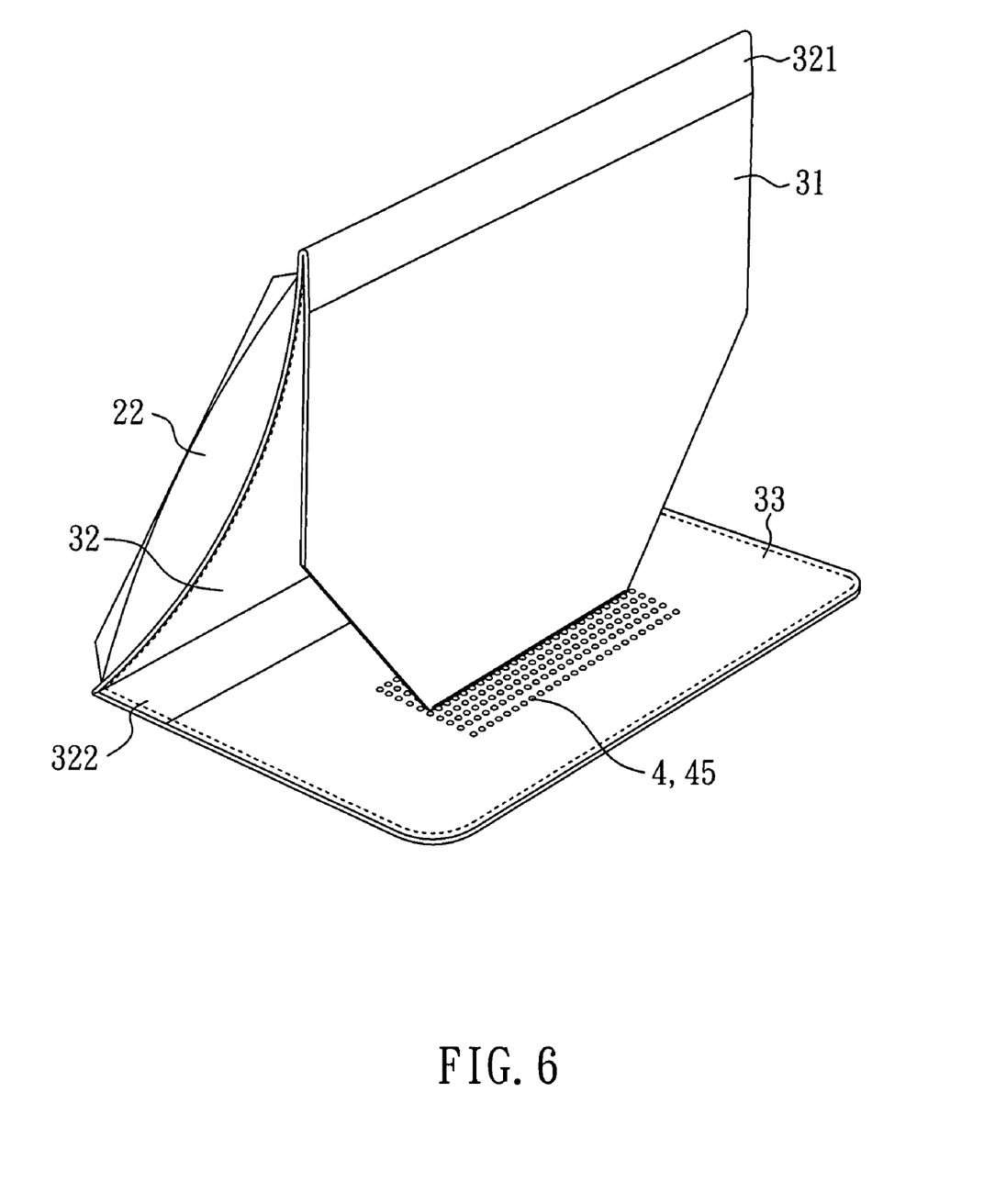
FIG. 6 is a perspective view illustrating an LCD display with adjustable view-angle structure according to a fourth embodiment of the present invention, wherein the LCD display is sustained in an adjusted angular position.

As shown in FIG. 6, a perspective view illustrating an LCD display with adjustable view-angle structure according to a fourth embodiment of the present invention. The fourth embodiment has a structure similar to that of the first embodiment except that the positioning means 4 has a rough surface 45 having fine particles. In other words, the slots 41 on the surface of the third segment 33 are replaced with the rough surface 45. Therefore, the front end of the first segment 31 can be placed on the rough surface 45 to adjust the view angle. In the fourth embodiment there is no such frame 311 provided at the front end of the first segment 31. Similarly, in the present embodiment, not only the purposes of protecting the display, adjusting the view angle thereof, and cost saving can be achieved, but also the view angle of the display can be adjusted in a very small scale.

Figure 7:
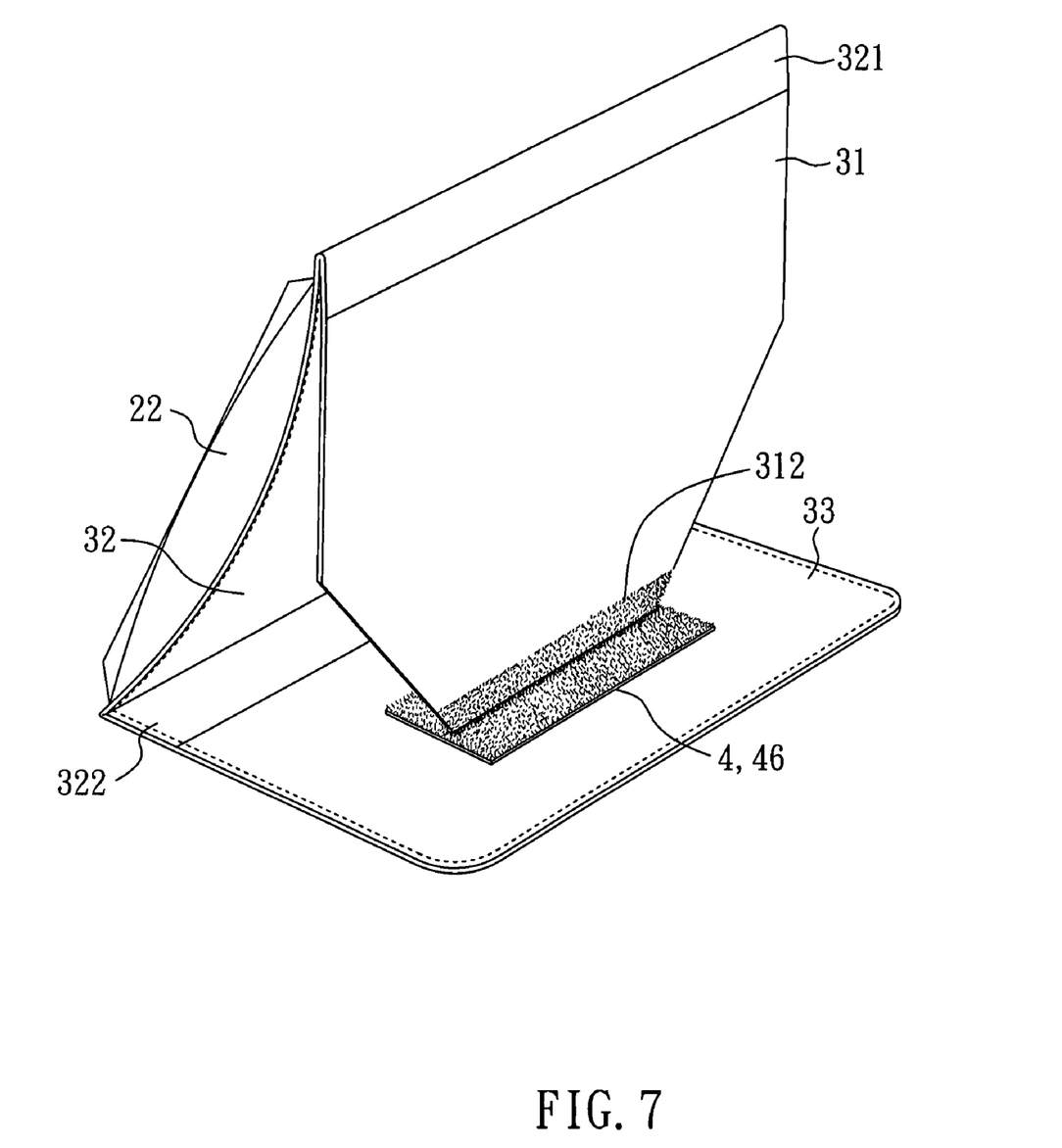
FIG. 7 is a perspective view illustrating an LCD display with adjustable view-angle structure according to a fifth embodiment of the present invention, wherein the LCD display is sustained in an adjusted angular position.

In a fifth embodiment of the present invention, as shown in FIG. 7, an LCD display with adjustable view-angle structure has a structure similar to that of the first embodiment except that the positioning means 4 has a Velcro 46. The slots 41 on the surface of the third segment 33 are replaced with the Velcro 46. In addition, a Velcro 312 is provided at the front end of the first segment 31 so as to replace the frame 311 provided in the first embodiment. Likewise, not only the purposes of protecting the display, adjusting the view angle thereof, and cost saving can be achieved in the present embodiment, but also the view angle of the display can be adjusted in a very small scale.

Although the present invention has been explained in relation to its preferred embodiments, it is to be understood that many other possible modifications and variations can be made without departing from the scope of the invention as hereinafter claimed.

What is claimed is:

1. An LCD display with adjustable view-angle structure, comprising:

an LCD body, including a screen and a casing;

a cover, including a first segment, a second segment, and a third segment, wherein the second segment is connected with a first foldable portion and a second foldable portion respectively, and wherein the first foldable portion is connected with the first segment and the second foldable portion is connected with the third segment, such that the cover is foldable and that the second segment of the cover is attached to the casing of the LCD body; and a positioning means, situated on a surface of the third segment, wherein the first segment and third segment unfold, the positioning means can make the front end of the first segment being retained on the surface of the third segment and thus support the LCD body in a standing position.

2. The LCD display with adjustable view-angle structure as claimed in claim 1, wherein the positioning means having a plurality of slots which are spaced from one another on the surface of the third segment so as to be engaged with the front end of the first segment.

3. The LCD display with adjustable view-angle structure as claimed in claim 2, further including an anchoring plate secured to the front end of the first segment so as to be engaged with one of the slots provided on the surface of the third segment.

4. The LCD display with adjustable view-angle structure as claimed in claim 2, further including a frame secured to the front end of the first segment.

5. The LCD display with adjustable view-angle structure as claimed in claim 1, wherein the positioning means having a plurality of ribs spaced from one another on the surface of the third segment so as to be engaged with the front end of the first segment.

6. The LCD display with adjustable view-angle structure as claimed in claim 1, wherein the positioning means having a rough surface provided on the surface of the third segment so as to be engaged with the front end of the first segment.

7. The LCD display with adjustable view-angle structure as claimed in claim 1, wherein the positioning means having a first Velcro provided on the surface of the third segment, and wherein a second Velcro is provided at the front end of the first segment to engage with the first Velcro.

8. The LCD display with adjustable view-angle structure as claimed in claim 1, further including a handle provided at the first foldable portion, wherein the first segment and the third segment are wrap around the LCD body, the LCD display appears in a portable state.

9. The LCD display with adjustable view-angle structure as claimed in claim 1, wherein the first segment of the cover is provided, at one side, with a fastener, and the third segment of the cover is provided, at one side corresponding to the fastener, with a fastening hole, such that when the cover is folded and the first and the third segments are wrap around the LCD display, the fastener can be engaged with the fastening hole so as to assure that the first segment and the third segment will not be separated from each other.

10. The LCD display with adjustable view-angle structure as claimed in claim 1, wherein the cover is made of leather.

* * * * *